US007860825B2

(12) United States Patent
Chatterjee et al.

(10) Patent No.: US 7,860,825 B2
(45) Date of Patent: Dec. 28, 2010

(54) METHOD FOR SYNCHRONIZING SOFTWARE APPLICATION AND USER DATA FOR ASYNCHRONOUS CLIENT-SERVER AND PEER TO PEER COMPUTER NETWORKS

(75) Inventors: Manjirnath Chatterjee, San Francisco, CA (US); Gregory Robert Simon, San Francisco, CA (US)

(73) Assignee: Palm, Inc., Sunnyvale, CA (US)

( * ) Notice: Subject to any disclaimer, the term of this patent is extended or adjusted under 35 U.S.C. 154(b) by 88 days.

(21) Appl. No.: 11/382,058

(22) Filed: May 8, 2006

(65) Prior Publication Data
US 2007/0276836 A1 Nov. 29, 2007

(51) Int. Cl.
*G06F 17/30* (2006.01)
(52) U.S. Cl. ........................ 707/610; 709/200; 709/246; 705/51
(58) Field of Classification Search ................. 707/622, 707/613, 104.1; 709/200, 202, 246; 705/51
See application file for complete search history.

(56) References Cited

U.S. PATENT DOCUMENTS

| | | | |
|---|---|---|---|
| 6,321,358 B1 * | 11/2001 | Anderson | 714/763 |
| 6,684,250 B2 * | 1/2004 | Anderson et al. | 709/225 |
| 6,917,976 B1 * | 7/2005 | Slaughter et al. | 709/226 |
| 7,167,920 B2 * | 1/2007 | Traversat et al. | 709/230 |
| 7,302,634 B2 * | 11/2007 | Lucovsky et al. | 707/10 |
| 2002/0165961 A1 * | 11/2002 | Everdell et al. | 709/225 |
| 2005/0021752 A1 * | 1/2005 | Marimuthu et al. | 709/225 |
| 2005/0246415 A1 * | 11/2005 | Belfiore et al. | 709/203 |

* cited by examiner

*Primary Examiner*—Apu M Mofiz
*Assistant Examiner*—Mohammad N Rahman
(74) *Attorney, Agent, or Firm*—Kacvinsky Daisak, PLLC

(57) ABSTRACT

Web Applications run as software which is served through a portal or browser. However this precludes their use offline or when connectivity is not present. The present invention is a method for creating offline web applications and managing associated user data which is created offline and must later be reconciled with one or more central servers without a data collision. This allows the system to efficiently know which version of different pieces of user data are new and which need to be added to centralized servers. This method also applies to the actual web application program files so that software applications can be synchronized in addition to user data enabling a transparent online and offline user experience. The method described here also applies to mobile computing devices such as cellular telephones and personal digital assistants. A side benefit of the method introduced here is that data sets can be distributed in manner which allows peer to peer synchronization and filedata distribution. Lastly the method described herein minimizes the amount of transactional data required to synchronize data sets across a network thereby increasing efficiency of available bandwidth on a computer network using the system.

19 Claims, 12 Drawing Sheets

METHOD FOR SYNCHRONIZING SOFTWARE APPLICATION AND USER DATA FOR ASYNCHRONOUS CLIENT-SERVER AND PEER TO PEER COMPUTER NETWORKS

BACKGROUND OF THE INVENTION

1. Field of the Invention

The present invention generally relates to methods and apparatus for the use of synchronizing digital information combined with digital software code in a way which allows the data to be created or stored and then sent via various different network connections, such as client-server or peer-to-peer connectivity with out producing duplication errors and keeping all data globally addressable regardless of where on the network it is created or stored. The method can be used to track documents with their revisions in a networked environment where the there is no need for a single database to keep track of identifiers used to addressing the documents.

2. Prior Art

Previously there are several types of methods for synchronizing data in client-server or peer-to-peer network environments. These efforts focus around the synchronization of data objects, such as source code control systems, software interfaces, such as distributed execution frameworks, client-server applications, such as some email applications or specialized form filling applications. The following paragraphs detail the broad categories in which these systems operate to provide background for the present invention.

Source code control type systems work on the principle that each client computer is storing local copies of specific versions of files which are controlled and stored in a master database. This database is often called the master server, the source control server, the repository or depot. In the depot a SCDB (Source Control Database) save each specific file and its entire history as a series of versions. In other words each file which is stored in the SCDB has any version of that file over time. A client computer in the system can save new versions of the file to the SCDB which will add the new file as the top or head entry. At any time a client computer can request any of the previous versions of the file or add new files to create a new or top entry. Internally the SCDB may store differences between the various versions of the file to save space and in a sophisticated source control system only the differences may be transmitted between the client and the server to save communication bandwidth over the network. The set of files the client has at any given time is called a view. Within a view a client cannot automatically refer to multiple versions of the same file—only by explicit linking such as through programmatic control interface such as that of a config file. This can be cumbersome if a user wishes to store multiple versions of the same file and does not have detailed knowledge about source control systems and impossible if the user is not versed in technology such as config files.

Distributed software interfaces such as COM, DCOM, COM+ from Microsoft and CORBA by the Object Management Group consortium, use universal identifiers to synchronize interfaces of distributed components. These types of distributed systems work by a method of interface description and interrogation followed by an agreed upon calling convention. For example a component on a personal computer may make a request for a certain type of software object or interface. The distributed mediator system (for example COM/DCOM/COM+ in Microsoft or CORBA subsystem in OMG) then looks to see if that interface exists on a component either on the local computer or on a network attached computer. In order to distinguish the different software interfaces apart across vendors and across versions of software a UUID (Universally Unique IDentifier) system is used. In this method all interfaces are assigned, via a complex generation technique, a random number of sufficiently long length (say 128 bits or more) that any machine or software vendor can generate such a number and be confident that the number is unique in the entire software universe. This means there is no need for a centralized service which distributes the unique identifiers. These UUIDs are then used as the identifiers to which exact software interfaces are bound. For example a software service on one machine will as for an interface by its number, and the subsystem will then look to see if it can find a component which has this number as its designation. Upon finding it the calling component can be confident it is dealing with an interface it knows how to programmatically interact with. A secondary portion of this system is the use of Interface Description Languages (also called IDLs). Once the interface with the corresponding UUID is located and the underlying system facilitates the communications necessary, the calling program can programmatically test that the functional parameters, data structures, and method calls it wishes to use our supported. While such means are excellent at solving the problem of interface description and distributed method calling conventions they are not used for actually synchronizing files and data objects. This level of detail is left up to the various software modules to negotiate among themselves. For example a source control system could use this method to discover clients and server understanding the source control exchange protocol for differential updates, but the actual synchronization of the data and its versions is left up to the internal programming inside source control software modules.

Email systems and distributed form filling applications, such as handheld client server applications, work to give users varying amounts of service when the user is connected to the network and then attempt o bring a portion of that service to the user even when the network connectivity is not available. In email systems this is done in one of two general ways. The first method is to provide a web based interface, such as those provided by major web service providers or search engine firms, however these lack the ability to work offline so often a separate native software program is written to interface to the server and provide offline email services via a standard protocol such as IMAP or POP3.The challenge of such web-client software hybrid solutions is that the user experience is extremely disjoint—even when the software is working properly, the user interface between the web based presentation and the native software is quite different and the user must maintain a mental model of the buttons, control and layouts which correspond to like actions. Another method to achieve distributed email functionality is to use native software clients exclusively; however this results in the native software needing to be installed on every machine with which the user wishes to access their email. At times this is not possible, such as when a user logs in on from a guest terminal at an internet cafe. The present invention, as shall be explained in the objects and advantages section, addresses this need in a systematic fashion. Finally for form filling and survey applications, including, CRM (Customer Relationship Management), are primarily designed as online systems (for example web based where the user logs in to a centralized server or database application). The data for these types of applications is constantly being updated with various new information from distributed users or other services (such as price lists and quotes). However many persons with in the organization such as a sales force needs some portions of the application to be available when connectivity is not present such as during a customer visit. For these types of situations many systems either choose the email type solution discussed earlier where a separate client application is installed on a local device such as the salesperson's laptop computer or the form is cached as a page. Both of these solutions fail to create a truly seamless and portable experience—either the experience is not portable across multiple computers or guest computers or parts of the information are made available in a piece-wise manner resulting in non-optimal solutions from a productivity perspective.

The following directly cited prior art is related to the present invention while not addressing all the advantages of the present invention.

The following art demonstrates the state of the art in data synchronization for web based applications and data.

U.S. Pat. No. 6,954,757 describes a "Zero Latency Enterprise" ZLE which is a business model for showing the benefits of distributed synchronized software but does not have a method for performing the synchronization of data and applications without user intervention or without a programmer rewriting their code for the various supported platforms.

The following references describe methods for generation of universally unique identification numbers either with code or with specifications which are adopted by standards bodies: "GUID generation" <http://www.vbaccelerator.com/codelib/tlb/guid.htm> and RFC 4122—UUID generation (IETF) <http://www.faqs.org/rfcs/rfc4122.html>. These references do not describe how to setup up a synchronized data system and neither describes methods for synchronizing running application code. Related to this is Berners-Lee, T., "Universal Resource Identifiers in WWW," RFC 1630, June 1994. describes how such universal links can be made compatible with the World Wide Web infrastructure.

To create UUIDs it is common to use various cryptographic hash algorithms. The two most common the MD5 and SHA-1 are both listed here: Rivest, R., "The MD5 Message-Digest Algorithm", RFC 1321, April 1992; National Institute of Standards and Technology, "Secure Hash Standard", FIPS PUB 180-1, April 1995, <http://www.itl.nist.gov/fipspubs/fip180-1.htm>. The present invention makes use of these as building blocks. Neither of these standards describes a system other than mechanisms for generating the unique identifiers mostly for purposes of digital signature generation.

The following methods show how to synchronize LDAP (distributed directory service) http://www.openldap.org/conf/odd-wien-2003/jong.pdf, however it does not exploit the use of UUIDs which can be generated by any device on the network and does not investigate synchronization of elements outside that of which is necessary to run a distributed directory service.

Several methods exist to replicate a database, whether a relational database or file based database (source control) but these methods do not address the issue of generating keys and signatures for each item asynchronously of each other. In the relational database the data is cloned from one database to another and the idea that primary keys in the same namespace can be asynchronously generated to manage the individual data elements is not used. Instead keys from a single database are copied to the new database. If two different databases are to be merged than colliding primary keys must be handled by the processing performing the merging.

U.S. Pat. No. 5,920,863 "System and method for supporting transactions for a thin client lacking a persistent store in a distributed object-oriented environment" describes how to use UUIDs to manage remote procedure calls such as described in the above section on distributed software interfaces. It does not detail the rules for seeding the UUIDs or for synchronizing data or entire applications to the local computer.

U.S. Pat. No. 6,988,137 "System and method for synchronizing objects between two devices" uses UUIDs (called GUIDs in the patent) for synchronizing two sporadically connected volumes and then managing subIDs within the volume to synchronize the data. However this does not allow for synchronization across multiple servers (volumes) and also ties data to the volume upon which it is stored. The present invention sets up a method of synchronization where the elements are independent of the volume types or labels upon which they are cached or stored.

U.S. Pat. No. 5,574,898 "Dynamic software version auditor which monitors a process to provide a list of objects that are accessed" demonstrates a modern source control system in which versions are maintained in a centralized database and views are managed by end developers (client computers) to access specific file versions. However this requires a great amount of sophistication upon the part of the user to manage the various versions of the files. Also there is no way to provide synchronization across multiple servers as there must be a master server maintaining all the versioning data. Lastly the system deals with synchronizing files, such as those used for programming activities but does not handle dealing with synchronized metadata applied to those files or to actual running programs and program distribution.

U.S. Pat. No. 6,374,289 "Distributed client-based data caching system" describes a data system for caching distributed data and for efficiently describing, where, in a peer to peer environment, the data can be found. However this does not address the needs of determining in a concise manner which data is the same in the network or for dealing with applications rather than data which may be distributed to client computers.

OBJECTS AND ADVANTAGES

The present invention allows users of the system to run programs and create data regardless of whether they are situated on a computer network and still have that data be globally non-colliding and synchronizable. In addition the present invention allows the synchronization system for the data and program files to sync individual versions no matter where on the data is created and without need for a centralized master server which keeps track of either version numbers, IDs, or contents. The use of UUIDs minimizes the number of retries and network traffic involved in determining which actual items or versions a specific data set are present between any two nodes on the network. This means that only the minimal set of information need be exchanged without having to perform a file compare at any point of the synchronization process even across multiple servers and clients. Since the present invention details how metadata can be stored and extracted each data object may be stored as single row in a standard database such as via the use of SQL statements. This is key as it allows the metadata to be queried via database statments (such as SQL select statements) to allow for the searching of tags, names, and other objects while retaining the extremely efficient address ability of having each object be referenced uniquely as single integer number (its GSID). Effectively this allows the method described here to function as a queryable, versioned, distributed filestore which has extremely efficient synchronization properties, derived from the use of hashcodes and yet also provide the ability to add data and later reconcile that data between any sets of nodes in the larger system. Lastly if one treats the items as parts of a generic set of objects than the system can be used as a distributed file distribution with various nodes containing parts of the set and a single client obtaining the various parts from any of a number of servers. This is illustrated by the use of the manifest files.

DETAILED DESCRIPTION OF THE INVENTION

The system is composed of objects called Collections, Sets, and Items. An Item is a formal member of a set. Zero or more sets form a collection. The Collection of zero sets is an empty collection. The present invention describes how items and sets are created, labeled addressed and synchronized. In addition the present invention details how metadata is serialized in into individual items and how digital signatures and global identifiers are combined to form a complete system. Definitions for the system operation are given here for use throughout the rest of this description:

Set or Data Set—a group of Items, {referenced by singled UUID called the GSID. A set contains zero or more items each referenced by IIDs}

Item or Data Item—one member in a collection. {each referenced by a single UUID called the ItemID or IID}

Collection or Data Set Collection—a number of "sets" {referenced as a list of GSIDs}

GSID—a UUID which serves as the system global identifier for a set GSID

ItemID—A Globally Unique Identifier use for an Item in a Data Set. Also abbreviated IID UUID—A Mathematical construct for creating globally unique numbers in a distributed system.

referenced by—An object is addressed in the system by this reference, or example the GSID provides a reference key to identify a particular item or set Manifest File—An optional data item which can be used for facilitating a distributed download system since it contains info and signature info about a complete set.

DRAWINGS—FIGURES

Figure 5:
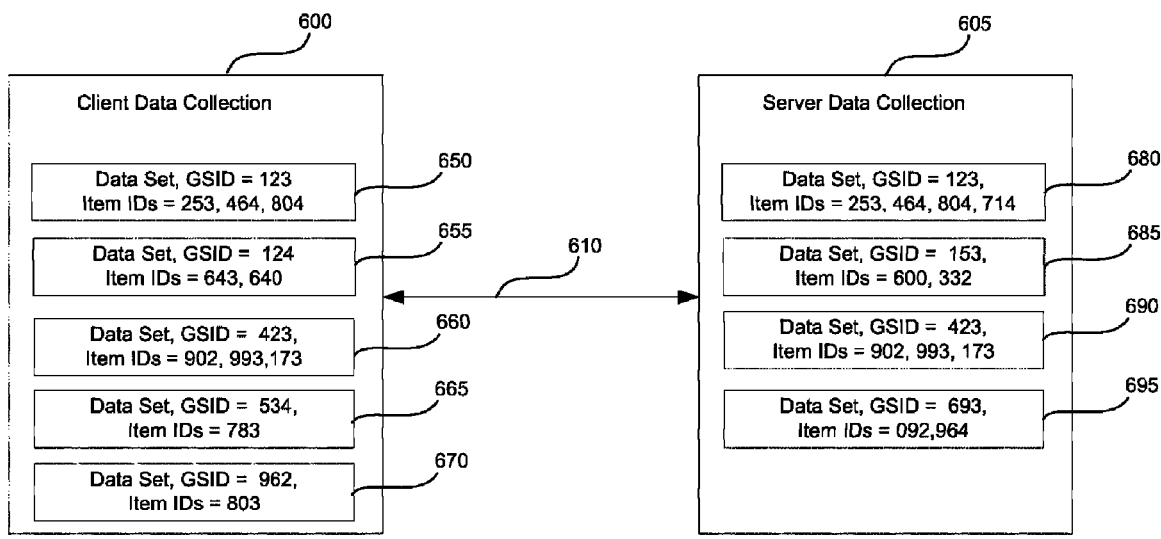
Figure 6:
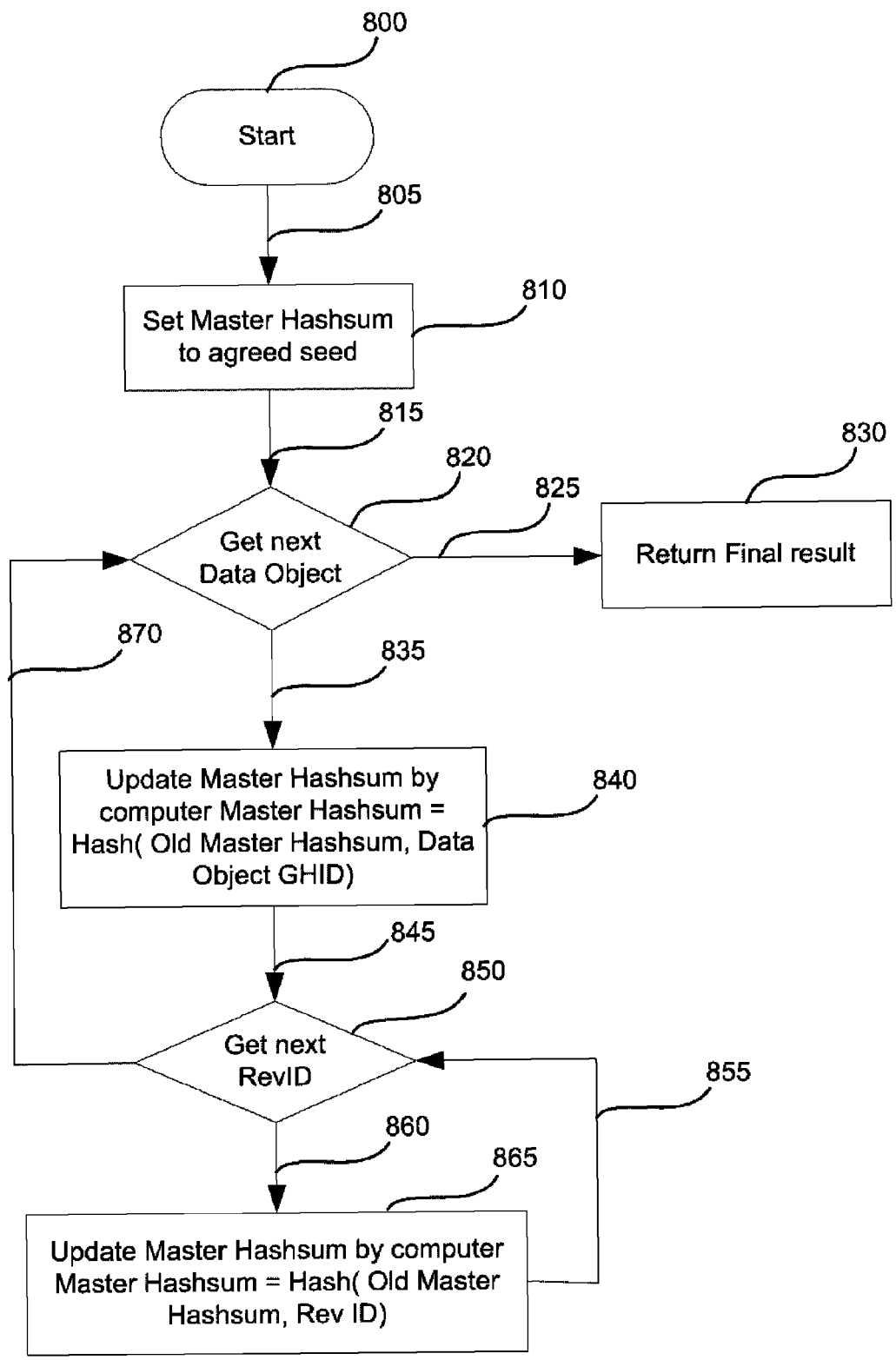
Figure 7:
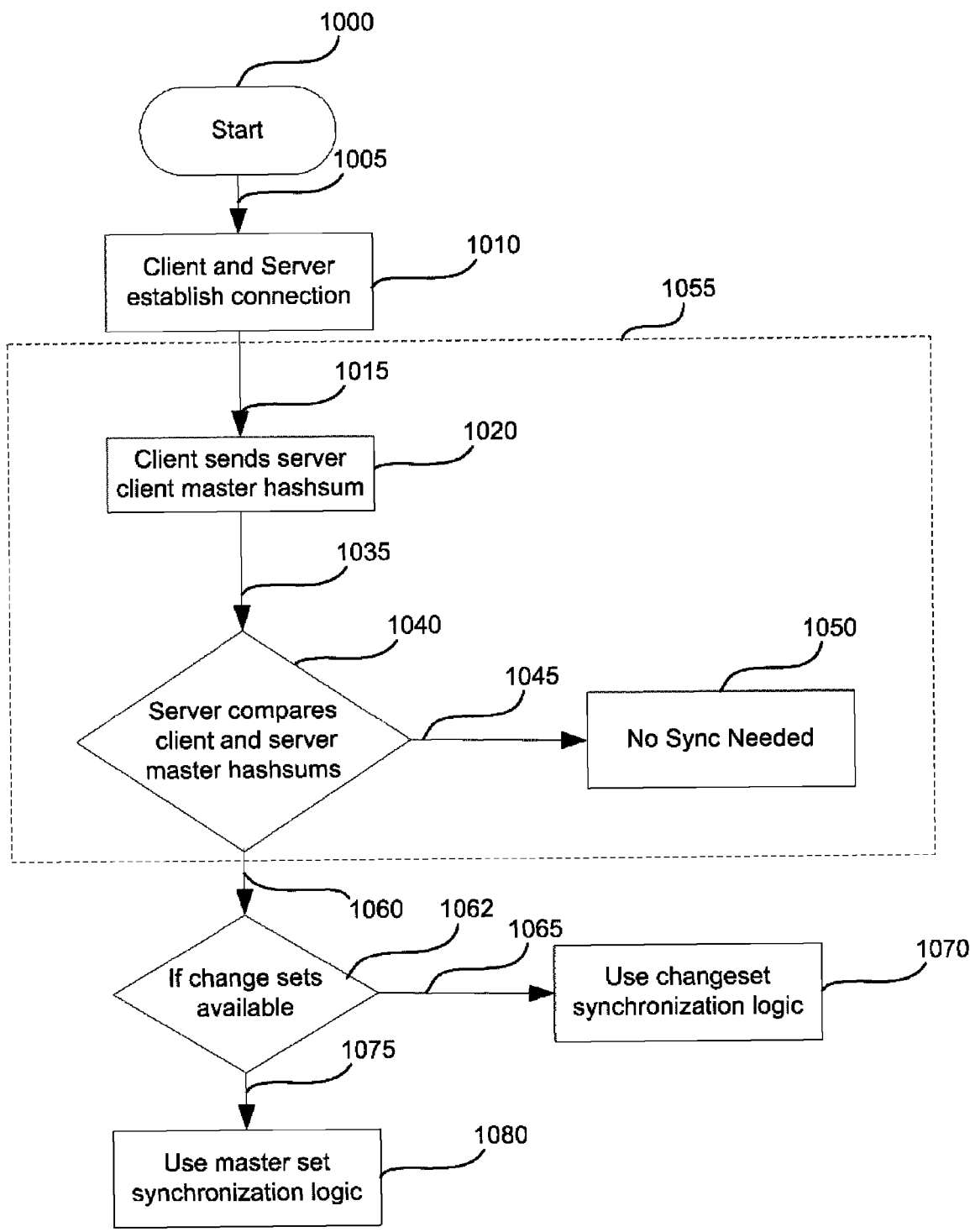
Figure 8:
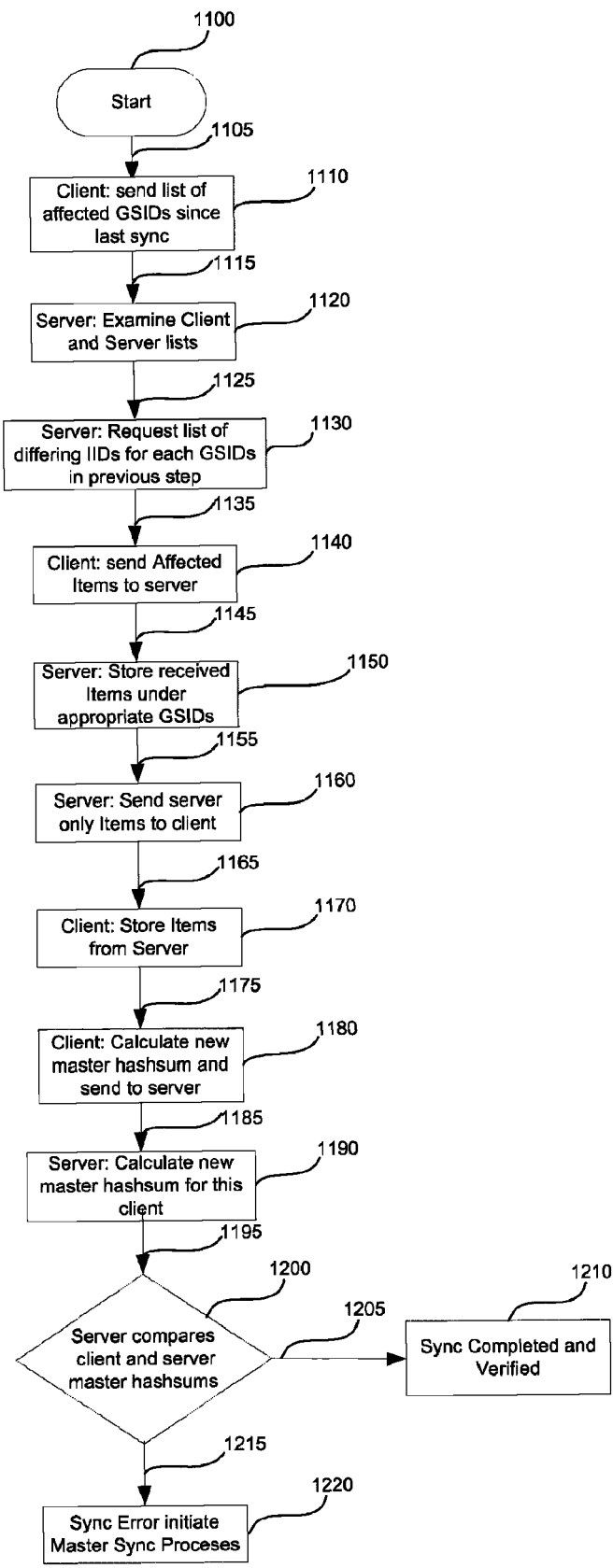
Figure 9:
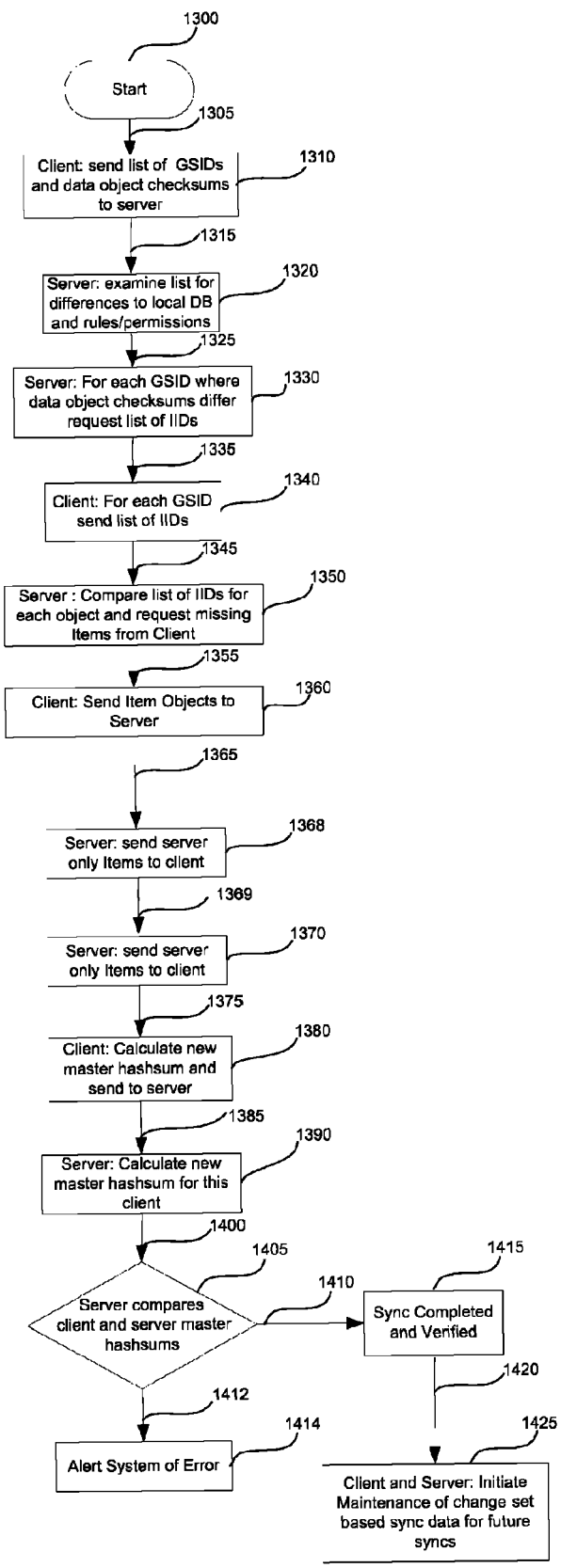
Figure 10:
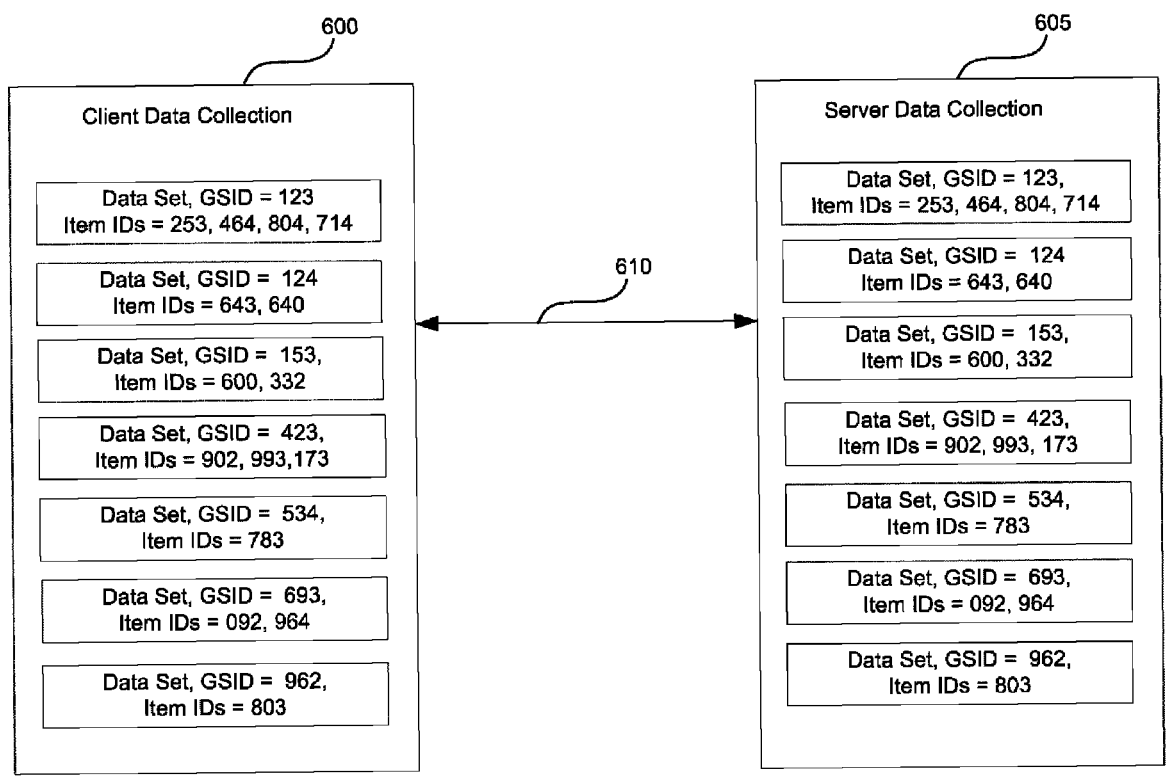
Figure 11:
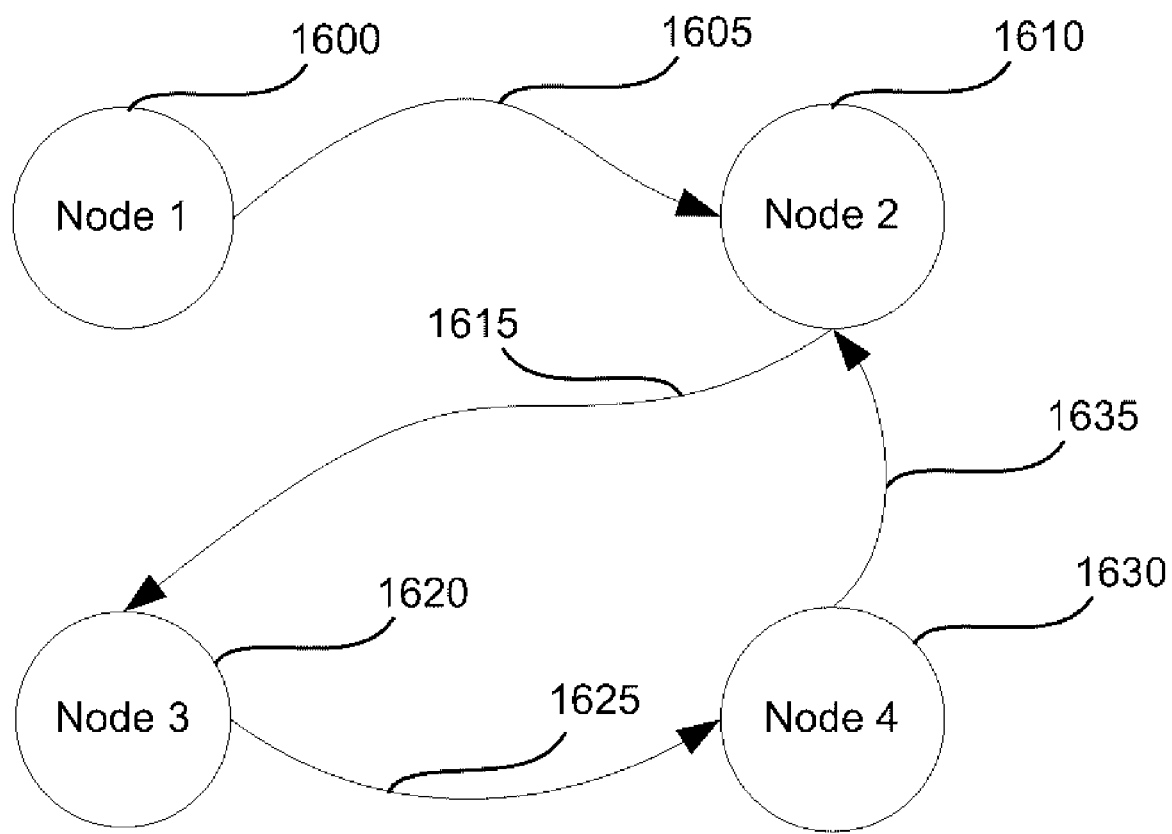
Figure 12:
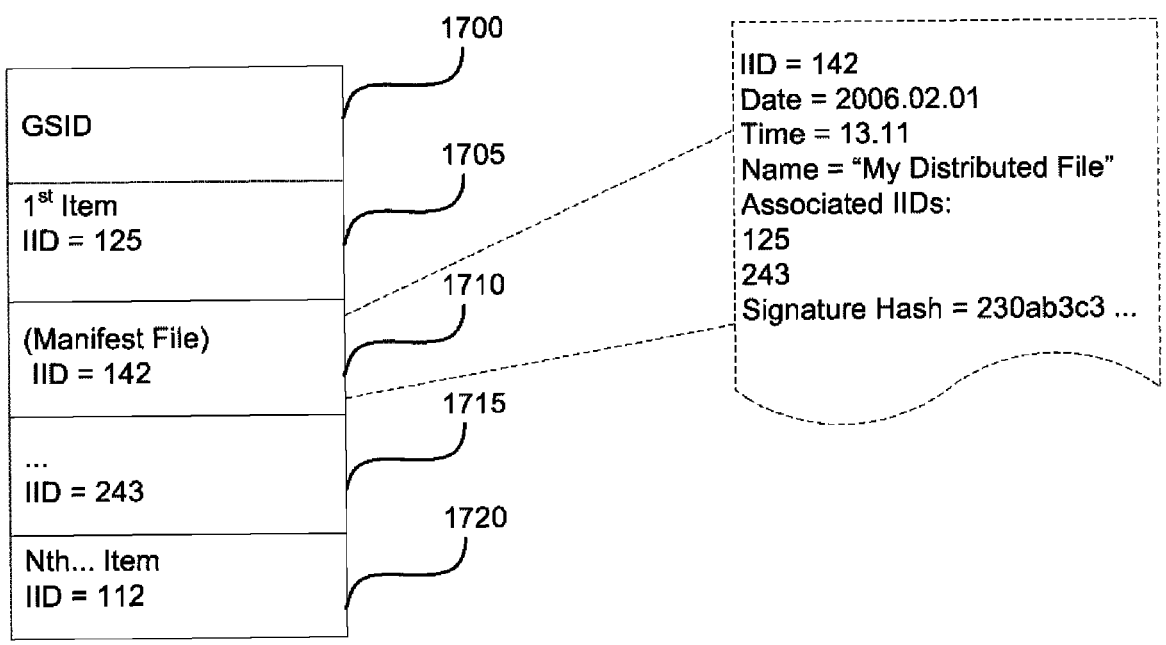

FIG. 5 Depicts the Data set collections of two nodes on a network before they are synchronized FIG. 6 Depicts the first phase of a synchronization cycle FIG. 7 Depicts the determination of which elements need to be synchronized cycle FIG. 8 Depicts the differential synchronization cycle FIG. 9 Depicts a master synchronization cycle FIG. 10 Shows two collections after synchronization FIG. 11 Illustrates the passage of data on a multinode computer network FIG. 12 Illustrates the use of manifest files for distributed data collection

DATA SET OBJECTS

Figure 1:
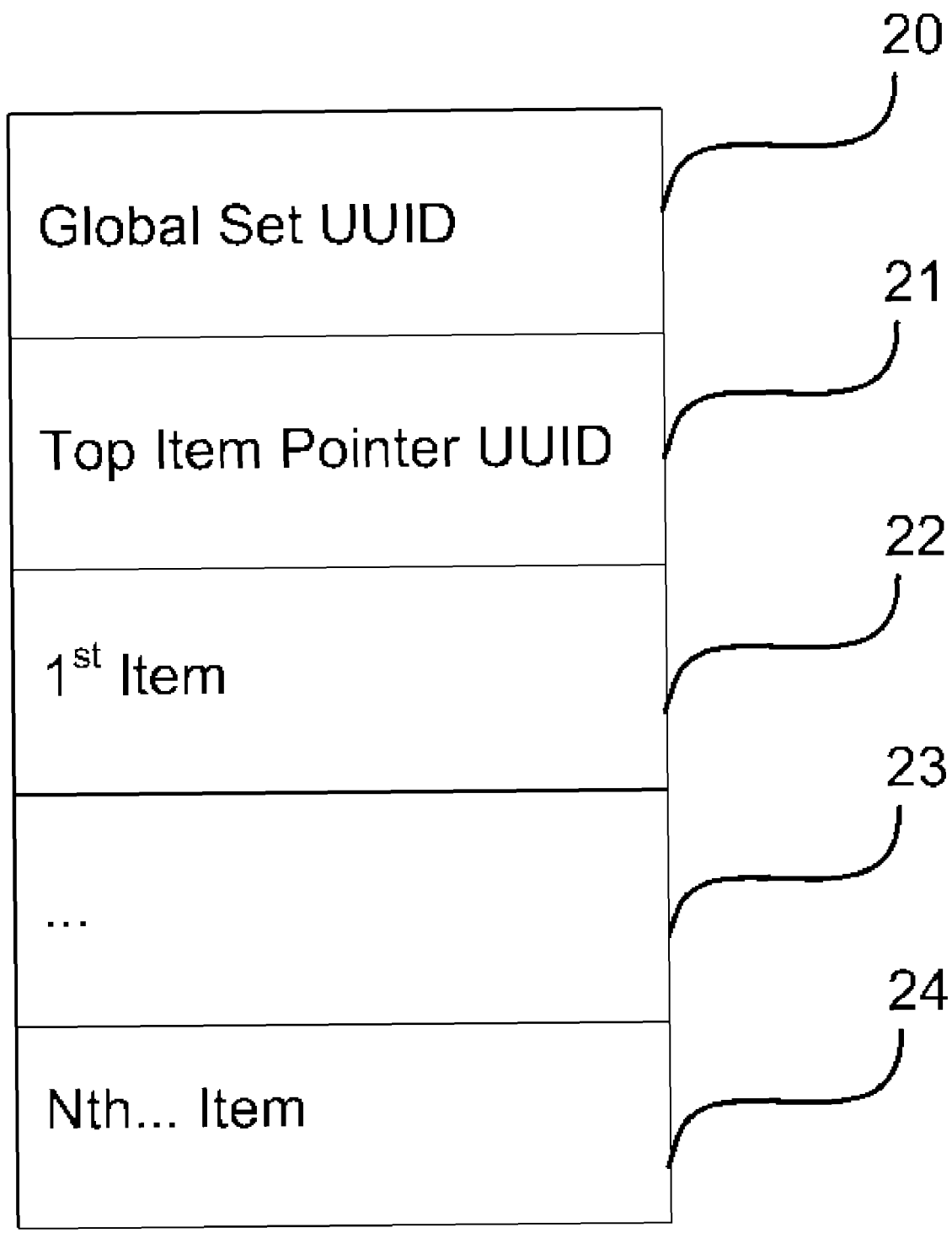
FIG. 1 and FIG. 2 show the basic data object blocks and their associated fields.

Each data set has the attributes as described in FIG. 1. Each data set has a Global Set Universally Unique IDentifier (abbreviated GSID) and marked 20 in FIG. 1. The GSID is a computed has a one-way hash sum from suitable local random data such that it is universally a unique number in the entire system. It is only created once in the lifetime of the object and this occurs at the first node the object is created at. Many algorithms can be used to generate such a number and the present invention assumes that one of these techniques will be used. Examples include performing an MD5 hashsum or SHA-1 hashsum where the inputs are local contents of the machine including the date, time, local data, and MAC address of the machine. The GSID is a large number integer in the mathematical sense on the order of 64 to 160 bits or more. For a given system implementation it is assumed to be fixed in size for all data objects in the entire system. The next attribute is optional and is called the Top Rev Pointer UUID (labeled by 21) in FIG. 1. Its purpose is to provide a pointer to which Item would be returned if the GSID is queried as a resource (If a system as for an item of this GSID and does not qualify which Item underneath this GSID is wanted the Top ItemID is the reference to which item in the collection would be returned). In source control terminology this would be analogous to the head revision. The other attributes of a data object are shown by 22, 23, and 24 in FIG. 1. Each of these items represents an item. All actual user or programmatic data in a file system analogy is stored in the revisions. Note that some implementations may not have field 21 (the Top Rev Pointer ID) and may instead use external rules or manifest files for determining the head revision. In these implementations, the Top Rev Pointer ID may be set to zero or simply omitted from the construction of the system. The only shared attribute among the revisions is the GSID. The GSID acts as a the data object identifier in the entire global system and the system entities will only addresses data objects by their associated GSID. Any user ideas of a textual filename or visible attributes are stored in metadata sections of individual items. Once a data object is created and a GSID assigned, the GSID will never change for the lifetime of the data object. This holds true even for duplication and synchronization of the data object across multiple clients and servers.

Item Objects

Figure 2:
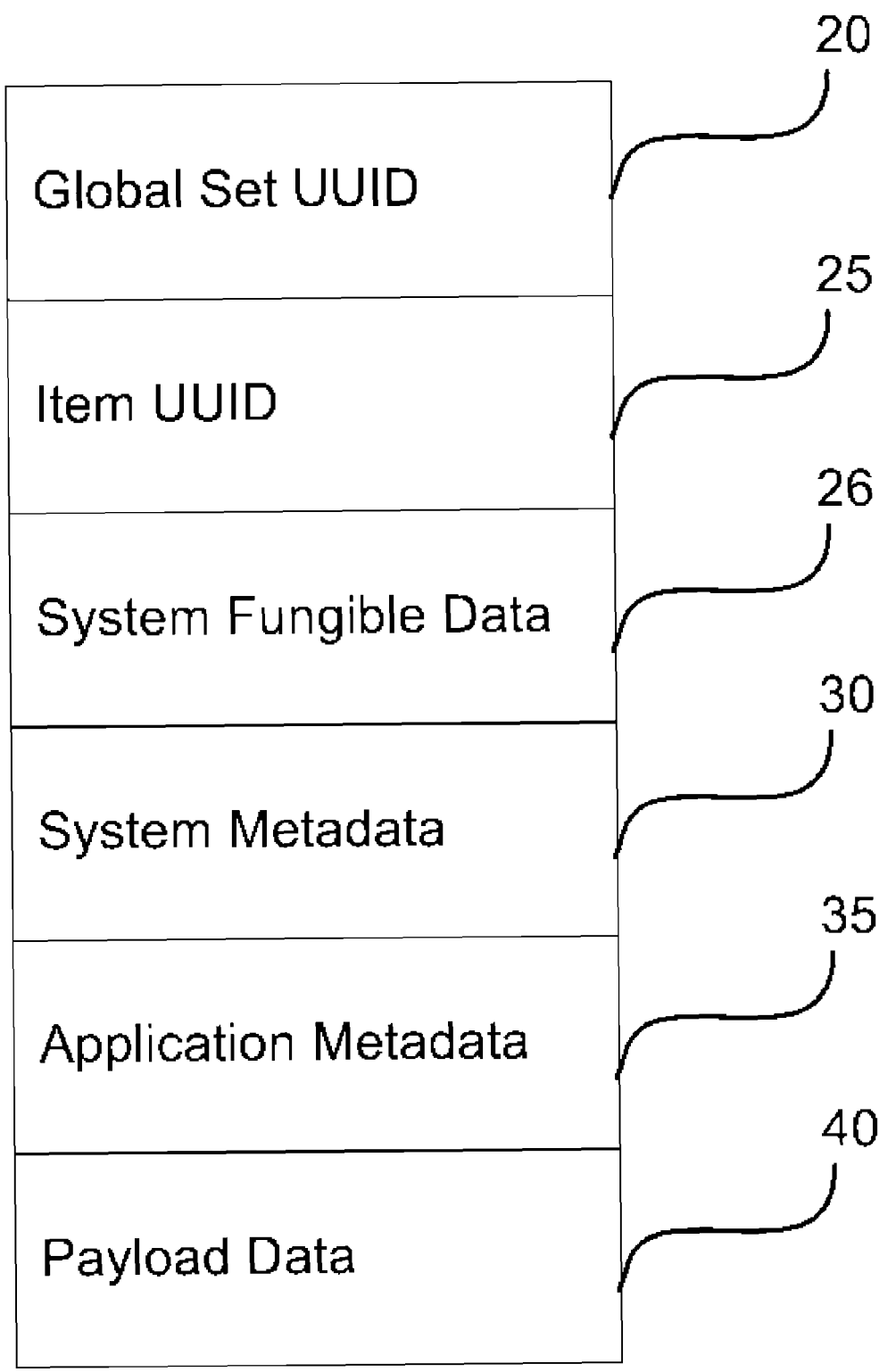

FIG. 2. describes the components of an Item. FIG. 2. Item 20 is the same GSID as is in FIG. 1. Although each revision also contains the GSID, the GSID may, for storage efficiency purposes only are stored in a single location in the local storage database. Hence the depiction of the GSID is only a logical depiction. However it is important to note (as will be explained shortly) that a single revision is bonded with a single GSID. Each revision also contains a UUID which is globally unique within the entire system called the Item ID which is labeled 25 in FIG. 2. This allows the item to be uniquely addressed as a particular version of data or directly as a specific instance of a data object from anywhere in the system. Hence a program running in the system may call for a data object either by its GSID, in which case the top item of the data set is returned or by a specific Item ID in which case the specific referred to item of the data set is returned instead. Note that the Item ID is calculated using a method which is explained in FIG. 3 and will often be abbreviated IID in this document. The other fields of a Revision object preserve actual data stored in the item. These are System Fungible data labeled 26 in FIG. 2. System Metadata labeled 30 in FIG. 2. Application Metadata labeled 35 in FIG. 2 and Payload Data labeled 40 in FIG. 2. System Fungible data is data which may be stored by the local system but is not tracked with the item. Any information placed there is essentially outside of the control and syncing system described here but many types of filesystems and datastores need some area of local storage (cache) hence one is defined here explicitly for that purpose. The System Metadata is name-value pair data stored in either textual or binary format which stores attributes about the given item. Examples of such attributes include data object type (e.g. it is a text file or a picture), filename information, authorship etc. System metadata is maintained by the underlying system described here in that applications using such data items do not have read or write permissions to system metadata. This allows system metadata to be used for auditing purposes such as user permissions, date time stamping, or system cache-ability and control. Application Metadata, labeled as 35 in FIG. 2 is name value pairs which a given application such as a word processor or spreadsheet may store in an associated document. Note that the meta data may be stored as XML (extensible Markup Language) documents or as binary data. The Payload Data labeled 40 in FIG. 2 is where application data is stored in its native format. Its content is application specific and the underlying synchronization system described in the present invention does not perform any logical operations other than storage for Payload Data. It should be noted that the content of FIG. 2 can also be expressed as single row in a database table. In this case the first entry (primary key) is the GSID and the next entry is the Revision ID. Each individual field in the System Metadata, System Fungible Data, and Application Metadata could then be expressed as individual columns in this row. The last item in the row is the payload data. The implication of storing data in this format is that the metadata can be queryable from a database language such as SQL while still retaining the properties of a synchronized distributed data object system.

Item Creation Process

Figure 3:
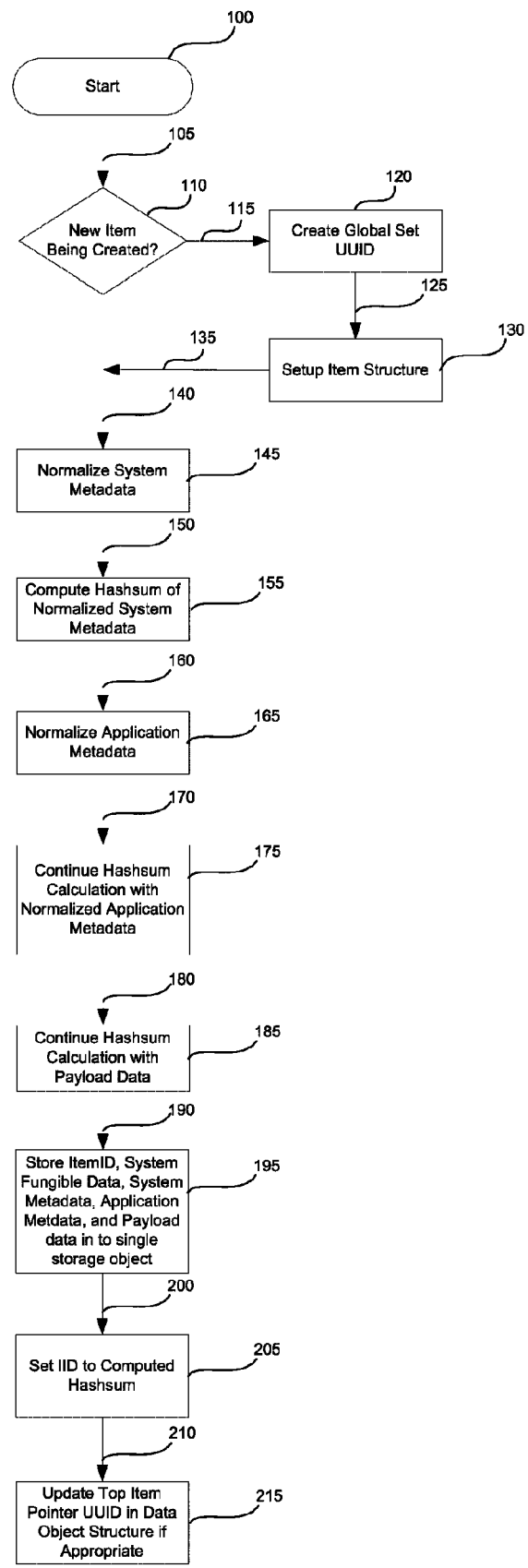
FIG. 3 Depicts the Object creation steps

FIG. 3. Describes the process by which new Items are stored in a data set. Starting with Start (label 100) through path 105 the decision box labeled 110 asks if this is a new data set object or adding an item to an existing data set. If a new data set object is being added to the system then path 115 is followed to box 120 where a new GSID is created. From there path 125 is followed to box 130 where local storage elements are setup for all the item information to be stored. Path 135 then connects back to path 140 where the process of creating and storing a new item begins. When a data object is first created the first item object is also created. The next step is to normalize the various metadata sections such that data order dependence will not affect checksum and Item ID calculations. This is accomplished by normalizing the system metadata as shown in box 145. The details for a reasonable normalization are detailed FIG. 4, however any process which produces a predictable deterministic ordering of the metadata is sufficient. Following path 150 to path 155 the hashsum of the normalized system metadata is computed. This hashsum produces an output which is identical to the number of bits in the Item ID. The hashsum is stored temporarily and the next phase continues via path 160 to box 165 where the application metadata is normalized in a similar manner. After the application metadata is normalized the hashsum calculation continues starting with the previously stored value and using the normalized application metadata as input. This is depicted by following path 170 to box 175. Once this completed path 180 is followed to 185 where the payload data is used to update the hashsum. Once this is completed path 190 is followed to box 195 where all the metadata and payload data are stored. Lastly path 200 is followed to box 205 where the Item ID is set equal to the final running hashsum. Note that by calculating the Item ID in this manner it is possible to set up a system whereby not only does the Item ID identify, uniquely in the global context a given revision but also to serve as a data integrity checksum insuring, with no additional overhead, that there will be bo collisions (two items containing different data but labeled with the same identifier) during a synchronization process. Note that if a the optional Top Rev Pointer UUID field is supported then it may be updated according to system or application specific rules to point to the new revision (e.g. the new IID would copied to the Top Rev Pointer ID) as in path 210 and box 215. The ItemID must be a sufficiently large hashsum, such as a 160 bit SHA-1 or larger to insure the collision avoidance properties are met.

Metadata Normalization Process

Figure 4:
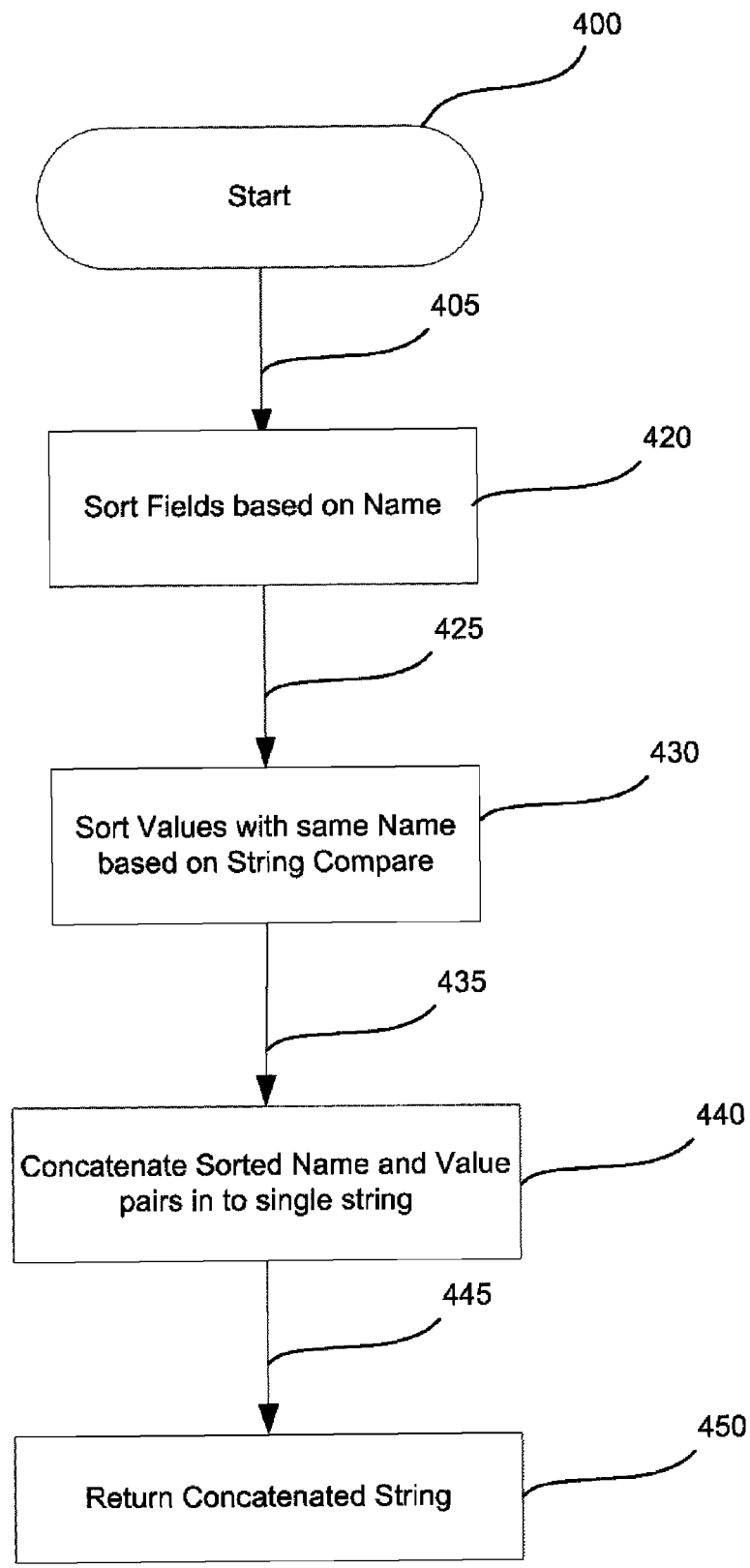
FIG. 4 Depicts meta-data ordering for purposes of hash value calculation

FIG. 4. Describes the overall handling of how to normalize any of the metadata stored in a specific item. This figure describes a typical metadata normalization process but any other may also be used as long as it is repeated in exactly the same order and manner at every node in the system. The purpose of the metadata normalization process is to convert the metadata in to a format which, when transformed in to, allows the hashsum calculation to produce a repeatable value. Since it is likely that metadata is entered and sorted in an ad-hoc order this step will remove the order for purposes of the hashsum calculation. This is particularly important when the payload is unaffected but the metadata may be used to update a particular application level or system level state in a data item. Starting with block 400 in FIG. 4 the normalization process begins by sorting the fields of the metadata based on the names of each field. This is depicted by taking path 405 to box 420 and then following box 425 to box 430. In box 430 the values for each field are sorted for those fields with the same name. After this path 435 is followed to box 445 where all the metadata is concatenated to form a single string. Lastly path 445 is followed to box 450 where the concatenated string is returned to the calling function. This concatenated string is the normalized form of the metadata. For example if the metadata consisted of 3 fields, name=john, name=bart, month=february then the normalization process will sort and concatenate these fields to a single string looking like name0bart0name0john0month0february0 where the 0 character represents the null terminator used for string handling in many languages. Note that some systems may wish that the ItemID is unique and uncorrelated to the system on which an object is created this can be accomplished by using a system identifier as a piece of metadata in this normalization process since the system ID will seed the calculation (irrespective of where in the calculution it occurs) it makes the item ID essentially appear to be to any outside observer a completely random number yet as can be seen from the calculation steps shown here it is still the signature for this item including its metadata.

A key reason for inserting metadata is that many data objects of filesystems or other storage mechanisms include system attributes which are outside of the file contents, such as when a file was last accessed, or which users have ownership rights. By making the transmission and normalization of these fields part of the file, Figure representing system high level—e.g. client and server with pool of objects FIG. 5. This figure describes how the system looks before a synchronization process is initiated. The client system is represented by label 600 and the server is represented by label 605. The client has a collection of data objects represented by the boxes labeled 650, 655, 660, 665, 670 while the server contains a collection of data objects represented by boxes 680, 685, 690, 695. For this example the GSIDs and the IIDs were made 3 digits long. This is solely for readability purposes. In practice the 64 bit to 160 bit or longer length of the UUIDs used would result in textual digit strings of 8 to 20 hexadecimal digits or more. No loss of generality, from an explanatory perspective is lost by using the smaller numbers however the implementer will note that no 2 Revision IDs or GSIDs are the same. In this explanatory example neither the client nor the server has the superset of the documents before the synchronization process is initiated.

FIG. 6. Depicts a method for calculation of the master hashsum of the entire set of data sets and items on either the client or server. Its use will be detailed in the next section depicting the synchronization process which is explained in FIG. 7. For purposes of minimizing bandwidth it is desirable to send the smallest amount of data as possible when performing a poll for whether a synchronization session should be initiated. There are two main approaches to do this. The first is that the client and the server each maintain change sets, as is common in the source control industry. In this method, after synchronization is completed it is assumed that both the client and the server contain identical sets of data objects. If the client or server makes changes to the local set those changes are recorded in a file called a change set or difference set. This file keeps track of changes made locally relative to what existed at the last synchronization process. At the next communication each side synchronizes based on change sets to determine what should be transmitted to the other side. This works well when there is a single centralized server and multiple clients which all check in from time to time. However if the server is mirrored to another location and the client checks in to this other server, it may be possible for both the client and the new mirrored server to have small or identical sets of data objects even if the two individual machines have never made a connection. To check for this efficiently the present invention makes use of a master hashsum as calculated in FIG. 6. The hashsum calculation itself is assumed to be a strong large one way cryptographic hash of suitable length. Minimum suggested length would be a 160 bit SHA-1 or stronger to avoid collisions. Any suitable strong one way hash from current literature can be used as would be known by those skilled in the art. The master hashsum is calculated by starting at 800 in FIG. 6. Proceeding down path 805 to box 810 we set the initial value of the hashsum to zero for default purposes however some implementations may use a fixed value or session specific seed. Using a session specific seed allows sync collision avoidance through the numerical equivalent of password salting as would be known by those skilled in cryptography. Following path 815 to diamond 820 we look for the next data object stored locally. If there is such a data object (the set of local data objects is not empty) we proceed along path 835 to box 840. Here we update the master hashsum by computing the new value as the old value hashed with the GSID for this particular data object. We then follow path 845 where we get the next IID contained with in this data object as is shown in 850. If this is the first time through then the first IID is used. From here path 860 is followed to update the master hashsum in the same mathematical manner as in box 840 except that here we update the master hashsum as hash of the previously computed master hashsum value and the current IID. After this is finished bath 855 is followed back to box 850. If there are any more IIDs remaining then we repeat the process (following 860 to 865 etc) until all IIDs for this data object have been used. When the last IID has been used to update the master hashsum as identified at box 850 we follow path 870 back to box 820. Now we examine the next data object. In this way the system uses two logical loops, the first to iterate over each data object, the second each IID inside each data object until all are completed. When there are no more data objects found in box 820 path 825 is followed to box 830 to give the final master hashsum. This final master hashsum represents master hashsum over all of the elements stored in the local repository and includes all data objects and their internal revs. Any difference between two master hashsums should signify a difference in sets whereas the probability two identical master hashsums not representing the same underlying data can be made so astronomically close to zero (by proper hashsum function choice) as to be a non factor in system design. Note that weak hashsums such as CRC-32 or fewer bits will fail and must not be employed in the present invention. It must be noted that in box 820 and 850 the order of the GSIDs and IIDs must always be presented in a sorted order. The type of sort is not important as long as both the client and server utilize the same sorting mechanism. For simplicity, the inventors recommend treating the GSIDs and IIDs as large (160 bit or larger) integers which can easily be presented to this algorithm from low to high. While this may not be the order of storage or other system manipulation it does allows the master hashsum calculation to be computed in a predictable and easy to debug manner. In addition the synchronization process may be partial or may be performed one-way (only one collection of data gets updated). In master-slave systems the deliberate absence of a GSID or IID can be construed as a deletetion command.

A method for quick data object set difference detection is depicted in FIG. 7. When the client connects to the server, on a presumably periodic basis, it is important that the two be able to immediately tell if a sync operation is necessary. This can be accomplished by sending a master hashsum as calculated via technique such as shown in FIG. 6. Starting at box 100 and following path 1005 to box 1010 where the server and client establish a connection over a network. The operations bounded by Box 1055 depict the detection mechanism for sync authorization in its essence. Following path 1015 to box 1020 the client sends the server the master hashsum it has calculated according to FIG. 6. Following path 1035 to box 1040 the server then compares its master hashsum with the client's master hashsum. If they are the same path 1045 is followed to box 1050. Since the results are the same it is assumed no sync operation is needed. If the hashsums differ then path 1060 is followed to box 1062. In box 1062 the server examines whether changesets are available. Change sets are lists of GSIDs kept by the client and server of all the data objects and items under their control. If a data object or item is added or deleted then this is added to a list which is the set difference (changes) since the last synchronization took place between the client and server. Each client and each server maintain changesets and differences of what has changed locally relative to what was present at the last synchronization. If changesets are available path 1065 is followed to box 1070 where changeset synchronization logic is used (this is explained in FIG. 8). Changeset based synchronization is efficient since both sides effectively know what to send the other side at the time of synchronization without interrogating (matching up) the entire list of data objects and items at each synchronization time. If changeset based synchronization is not available such as when a new client connects to a server of if the client has been damaged and must be repopulated, then path 1075 is followed to box 1080 to initiate the Master Sync process which is detailed in FIG. 9. In the Master Sync process it is assumed that information about what is already present at either the server or client (or both) is unavailable and that the entire data sets must be mutually synchronized (some data objects will be transferred from the client to the server and some data objects will be sent from the server to the client).

The Changeset or Differential Difference type synchronization process alluded to in box 1070 in FIG. 7 is shown in FIG. 8. The Changeset based or file-set-difference based synchronization process is preferred for it bandwidth efficiency and is depicted in FIG. 8. Starting at 1100 and following the path 1105 to box 1110 we assume that the client and server have already established a connection. In box 1110 the client sends a list of GSIDs which have either been added, deleted, or had one of their internal items added or deleted (in other words changed state) since the last synchronization between the client and the server. Following path 1115 to box 1120 the server receives the list from the client and examines its own list for analysis. Though this step is not critical to the synchronization process it allows the server to then run internal rules to optimize subsequent synchronization requests as may be appropriate for a local access control policy. Following path 1125 to box 1130 the server assembles a list of GSIDs where the Revs have changed or a new GSID (representing a data object which the server does) not have is sent to the client. Following path 1135 to box 1140 the client sends the full data associated with the items from the request in box 1130. The server now has the all of the client side differences and effectively has the union of the original client and server data sets. Taking path 1145 to box 1150 the server stores the received item data under the appropriate GSIDs in the server data store. Then following path 1155 to box 1160 the server sends the data which the client does not possess including new GSIDs and IIDs to the client. Taking path 1165 to box 1170 the client stores the items it received from the server in its local data store. Taking the path 1175 to box 1180 the client calculates a new master hashsum and sends this to the server. Following path 1185 to box 1190 the server also calculates a new master hashsum for the set of data objects with which it interacts with this particular client. Taking path 1195 to box 1200 the server compares the new master hashsums. If the master hashsums agree then path 1205 is followed to box 1210. The synchronization process is completed and verified. If the 1215 hashsums do not agree then path 1215 is taken to box 1220. Box 1220 represents a sync error since the master hashsums don't agree. This probably means the differential file sets were not up to date or a system or corruption error has occurred. In this case it is necessary to start a full master synchronization process as outlined in FIG. 9. Note that the master synchronization process can apply to subsets of a full collection. In otherwords in a given synchronization operation, only a subset of data sets/items may be syncrhonized depending on the rules of the system. Also by combining master and differential synchronization methods, it is possible to interrupt the synchronization process and resume as those items which are completed are automatically moved to differential mode.

The Master Synchronization Process for full data object synchronization when the contents of the server and or the client are not entirely known beforehand is depicted in FIG. 9. This corresponds to the box 1080 in FIG. 7. Starting with box 1300 we follow path 1305 to box 1310. Here the client sends a list of all the GSIDs it currently has in its inventory and a hashsum for each data object. This list can be thought of as list of pairs [GSID, hashsum] for each object the client has locally stored. The individual hashsums are calculated, on a per object basis, using a technique similar to the one outlined in FIG. 6. Following path 1315 we arrive at box 1320. The server examines the data objects it has and computes the hashsum for each GSID the client has transmitted. For all the GSIDs where the data object checksums do not match the server assembles a list of all of all GSIDS for which the server would like a list of the IIDs associated with each particular GSID. In other words for a particular GSID in which the hashsums do not match the server needs the client to report which IIDs the client is storing locally. The server transmits this list in 1330 and following path 1335 we arrive at box 1340. Here the client assembles the per GSID list of IIDs per the server's request and sends the list of IIDs stored on the client for each of the server's requested GSIDs. Proceeding down path 1345 to box 1350 the server now compares, for each GSID, the IIDs stored on the client. The server is now in the position to know exactly each GSID and IID (and like associations) stored on the client. The last act in box 1350 is to send the list of missing IIDs to the client. Following path 1355 we arrive at box 1360 where the client, upon receiving of the IIDs from the server now sends the actual data object contents to the server. Following path 1364 we arrive at box 1368. Here the server now stores the data objects from the client. Following path 1369 to box 1370 the server sends the client the GSIDs and IIDs and data objects which the server has locally but the client is missing. This set of objects can be inferred from the information gathered in steps 1310 through 1350. Following path 1375 to box 1380 the client calculates a new master hashsum and sends to the server. Following path 1385 to box 1390 the server calculates a new master hashsum for this client. Following path 1400 to box 1405 the sever compares the master hashsums. If they do not agree and error has taken place. This is indicated on path 1412 to box 1414 where the error can be passed up to a higher level process. If need be the master sync process can be attempted again. If the hashsums agree then path 1410 is followed to box 1415 where the sync has been verified and completed. At this point path 1420 is followed to box 1425 where the changeset lists for future differential sync process can be begun.

FIG. 10. Depicts the process after synchronization. Copies of each object appear in both the client 600 and the server 605. Note that both the client and the server are able to perform seamless merges simply because the synchronization logic is merely figuring out the most efficient means of transporting set differences. There are never collisions since the GSIDs and IIDs of the objects never collide and hence it is merely a situation where the synchronization logic needs to avoid wasting bandwidth sending items or data objects which already exist on the opposite side of the sync arrow represented by label 610. The labels in FIG. 10. Directly correspond to FIG. 5 as these represent the same components.

FIG. 11. Depicts a computer or network system which has multiple nodes each utilizing the method of the invention to share and transmit data. FIG. 11 is an illustration of how data can be shared and that the order and syncrhonization time of the data will not cause collisions or for arbiting of which piece of data is the correct version. Starting with Node 1 labeled as 1600 the a data set is synchronized via path 1605 to node with Node 2 labeled 1610. Then Node 2 performs a synchronization via path 1615 with Node 3 labeled 1620. Next Node three synchronizes its data with Node 4 labeled 1630 via path 1625. Finally Node 4 performs a syncrhonization illustrated via path 1635 back to Node 2. In each of these syncrhonziations the steps and data structures in FIGS. 1-10 are followed. It is possible depending on some systems that the synchronizations are performed in only a single direction (e.g. a 1 way synchronization versus a complete 2-way synchronization). This choice of 1 way or 2 way synchronization is as system selectable choice. What is important in FIG. 11 is that no data collisions can occur even under such a multiway sharing or synchronization set of paths. This is because each piece of addressable data, whether an item or a set, is identified by a globally unique identifier. This definitively means that when Node 4 synchronizes with Node 2, that data already contained on Node 2 will not be resynchronized and that new data added will be syncrhonized if the system rules require new data to be included in the synchronization process.

FIG. 12. Depicts the use of manifest files for distributed file system use. Since a Data set only refers to a GSID and a number of objects and since individual items can be added to sets at anytime if a client wishes to get a "complete" file where file is defined as 1 or more item objects but only has the GSID then a method needs to be defined to assist in this. Also if one wishes to break up a file in to small chunks each stored as an item then we need to know when the entire file is complete and perhaps even what the sequence to reassemble the original file from the item—chunks is. A manifest file is a standard item where the metadata and payload refer to other items in the set. The manifest file contains a list of ItemIDs to rebuild a complete file and hashsums and other metadata useful for insuring that the file is complete. In this way some nodes may deliberately not store all the pieces of a set referenced by a single GSID but may instead store portions and a given client reassembling the file must query multiple nodes as it moves down the list of IIDs stored in a given manifest file. In such as system it may be possible to store multiple manifest files along with multiple data files as objects in a given set referenced by a single GSID. When this is done it simply implies that several versions of a file can be built from the set referenced by a single GSID. FIG. 12 depicts a data set object where 1700 is the GSID (same as 1 in FIG. 1). 1705 represents the first Item. In FIG. 12 1715 and 1720 represent other items in the collection. Note that 3 digit IIDs are used for illustrative purposes and that in a real system these would be large UUID hexadecimal numbers. 1710 is an Item and also happens to be a manifest file. Its contents are expanded to the right. Here we see that it contains some metadata and a list of ItemIDs which reference Items 125 and 243. This means that when this Item (number 142) and Items 125 and 243 are retrieved the file represented as an aggregate of this data can be reconstituted including any associated metadata and checksums. By using manifest files it is possible to create chunked distributed file systems in which various nodes contain various items and only when the data is needed does a client interrogate the nodes of the computer network to look for the missing parts.

What is claimed is:

1. A method, comprising:
    generating a global set universally unique identifier for a data set object using a one-way hash sum and local random data, the global set universally unique identifier representing a unique number in a distributed data sharing system;
    creating an item object for the data set object, the item object having the global set universal unique identifier, system metadata and application metadata;
    normalizing the system metadata and the application metadata to produce a predictable deterministic ordering of the metadata in a format that allows the one-way hash sum to use the normalized metadata to produce a repeatable value, the format comprising a concatenated string of sorted names and values from a field of the system metadata or application metadata;
    creating an item universally unique identifier for the item object of the data set object using the one-way hash sum, the normalized system metadata and the normalized application metadata, the item universally unique identifier also representing a unique number in the distributed data sharing system; and
    storing the data set object and the item object for the data set object at a client.

2. The method of claim 1, comprising creating the item universally unique identifier for the item object of the data set object using the one-way hash sum, the normalized metadata, and payload data for the item object.

3. The method of claim 1, comprising:
    sorting fields of the system metadata based on names for each field;
    sorting values for each field having a same name; and
    concatenating the sorted names and values for each field into a single string to form the normalized system metadata.

4. The method of claim 1, comprising:
    sorting fields of the application metadata based on names for each field;
    sorting values for each field having a same name; and
    concatenating the sorted names and values for each field into a single string to form the normalized application metadata.

5. The method of claim 1, comprising calculating a master hashsum for multiple data set objects and respective item objects stored by the client.

6. The method of claim 5, comprising sending the master hashsum from the client to a server.

7. The method of claim 6, comprising determining whether to synchronize some or all of the multiple data set objects and respective item objects with the server based on the master hashsum.

8. The method of claim 1, comprising synchronizing the data set object and the item object stored by the client with a corresponding data set object and item object stored by a server using the global set universally unique identifier or the item universally unique identifier.

9. The method of claim 8, comprising synchronizing the data set object and the item object stored by the client using differential based synchronization operations.

10. The method of claim 8, comprising performing a one-way synchronization between the client and the server.

11. The method of claim 8, comprising performing a two-way synchronization between the client and the server.

12. The method of claim 1, comprising storing the system metadata and the application metadata for the item object as binary information, textual information or XML.

13. The method of claim 1, comprising creating a manifest file to describe distributed item objects for the data set object.

14. The method of claim 1, comprising segmenting item objects of said data set object by ranges of item universally unique identifiers to determine which item objects to synchronize with another device.

15. An article comprising a storage medium containing instructions that when executed enable a system to:
    generate a global set universally unique identifier for a data set object using a one-way hash sum and local random data, the global set universally unique identifier representing a unique number in a distributed data sharing system;
    create an item object for the data set object, the item object having the global set universal unique identifier, metadata, and payload data;
    normalize the metadata to produce a predictable deterministic ordering of the metadata in a format that allows the one-way hash sum to use the normalized metadata to produce a repeatable value, the format comprising a concatenated string of sorted names and values from a field of the metadata;
    create an item universally unique identifier for the item object of the data set object using the one-way hash sum, the normalized metadata, and the payload data, the item universally unique identifier also representing a unique number in the distributed data sharing system; and
    synchronize the data set object or the item object with another device using the global set universally unique identifier or the item universally unique identifier.

16. The article of claim 15, further comprising instructions that when executed enable the system to:

sort fields of the metadata based on names for each field;
sort values for each field having a same name; and
concatenate the sorted names and values for each field into a single string to form the normalized metadata.

17. The article of claim 15, further comprising instructions that when executed enable the system to synchronize the data set object or the item object with the other device using differential based synchronization operations.

18. A mobile device, comprising:
means for creating a global set universally unique identifier for a data set object using a one-way hash sum and local random data, the global set universally unique identifier representing a unique number in a distributed data sharing system;
means for creating an item object for the data set object, the item object having the global set universal unique identifier, metadata, and payload data;
means for normalizing the metadata to produce a predictable deterministic ordering of the metadata in a format that allows the one-way hash sum to use the normalized metadata to produce a repeatable value, the format comprising a concatenated string of sorted names and values from a field of the metadata;
means for creating an item universally unique identifier for the item object of the data set object using the one-way hash sum, the normalized metadata, and the payload data, the item universally unique identifier also representing a unique number in the distributed data sharing system; and
means for synchronizing the data set object or the item object with another device using the global set universally unique identifier or the item universally unique identifier.

19. The mobile device of claim 18, comprising means for synchronizing the data set object or the item object with another device using differential based synchronization operations.

* * * * *